US007720025B2

(12) United States Patent
Asmare et al.

(10) Patent No.: US 7,720,025 B2
(45) Date of Patent: May 18, 2010

(54) METHOD FOR SEARCHING SERVICES, RESOURCES AND/OR FUNCTIONALITIES IN A NETWORK

(75) Inventors: Eskindir Asmare, Heldelberg (DE); Marcus Brunner, Heldelberg (DE); Stefan Schmid, Heldelberg (DE)

(73) Assignee: NEC Corporation, Tokyo (JP)

( * ) Notice: Subject to any disclaimer, the term of this patent is extended or adjusted under 35 U.S.C. 154(b) by 1182 days.

(21) Appl. No.: 11/312,438

(22) Filed: Dec. 21, 2005

(65) Prior Publication Data

US 2006/0140124 A1    Jun. 29, 2006

(30) Foreign Application Priority Data

Dec. 23, 2004   (DE) ........................ 10 2004 063 461

(51) Int. Cl.
*H04W 4/00*    (2009.01)
(52) U.S. Cl. ...................................... 370/328; 370/322
(58) Field of Classification Search ................. 370/328, 370/332
See application file for complete search history.

(56) References Cited

U.S. PATENT DOCUMENTS

| 2004/0008687 | A1* | 1/2004 | Matsubara | ............. | 370/395.21 |
| 2005/0091396 | A1* | 4/2005 | Nilakantan et al. | .......... | 709/232 |
| 2005/0117526 | A1* | 6/2005 | Melnik | ........................ | 370/254 |

OTHER PUBLICATIONS

E. Guttman, C. Perkins, J. Veizades, M. Day, Service Location Protocol, Version 2, Internet RFC2608, 1999.
J. Hodges, R. Morgan, Lightweight Directory Access Protocol (v3): Technical Specification, Internet RFC3377.
K. S. Lim, R. Stadler, "A Navigation Pattern for Scalable Internet Management", Seventh IFIP/IEEE International Symposium on Integrated Network Management (IM2001), Seattle, USA, May 2001, pp. 405-420.

* cited by examiner

*Primary Examiner*—Patrick N Edouard
*Assistant Examiner*—Eric Elcenko
(74) *Attorney, Agent, or Firm*—Young & Thompson

(57) ABSTRACT

Method for searching services, resources and/or functionalities in a network wherein the network comprises a multitude of nodes to which routable network addresses are assigned, and wherein the services, resources and/or functionalities which are to be searched, are specified by a source node (Q) that is characterized in that a corresponding direction is specified within the network by at least one destination node (Z) and/or nodes near to the destination node (Z), by which a routing path is defined between the source node (Q) and the corresponding destination node (Z), and characterized in that only pre-configurable nodes near to the routing path between source node (Q) and destination node (Z) are included in the search.

1 Claim, 1 Drawing Sheet

METHOD FOR SEARCHING SERVICES, RESOURCES AND/OR FUNCTIONALITIES IN A NETWORK

BACKGROUND OF THE INVENTION

1. Field of the Invention

The present invention relates to a method for searching services, resources and/or functionalities in a network wherein the network comprises a multitude of nodes to which routable network addresses are assigned, and wherein the services, resources and/or functionalities which are to be searched, are specified by a source node.

2. Description of the Related Art

Methods of the mentioned kind have been state of the art for some time. With reference to an increasing trend to provide special services, resources and/or functionalities such as, for example, firewalls, data storage, media cache, transcoder etc. more and more on the network side, such methods steadily gain a growing importance.

In the framework of a concrete generic method, it is common to register available services or resources at a commonly known directory service. (See E. Guttman, C. Perkins, J. Veizades, M. Day, Service Location Protocol, Version 2, Internet RFC2608, 1999, and J. Hodges, R. Morgan, Lightweight Directory Access Protocol (v3): Technical Specification, Internet RFC3377.) Clients or nodes, respectively, searching for specific services/resources query directly this directory service. The disadvantage of this approach is that the continuous updating of the directory service is extremely cost-intensive. This is specifically the case in highly dynamic and/or mobile environments. The number of update requests that is necessary in order to keep the directory service up to date increases very much, in particular if the availability of a service or specific information needed for using a service changes often. The same is valid in case the node offering a service is a mobile node.

Another disadvantage going along with the use of a directory service is that a directory based service typically is not able to take into account topological aspects, i.e. in particular the location of a resource or a service within the network.

In another known approach, a "lookup" request is broadcasted into the network when looking for specific network-side services and/or resources. (See K. S. Lim, R. Stadler, "A Navigation Pattern for Scalable Internet Management", Seventh IFIP/IEEE International Symposium on Integrated Network Management (IM2001), Seattle, USA, May 2001, pp. 405-420). Nodes which are able and ready to provide the requested service or the requested resource, reply to this lookup request. This method is also called "flooding".

The significant disadvantage of this method is that it does not scale. In large networks the described approach causes an enormous amount of superfluous traffic and potentially a very high number of replies. Without a corresponding indication at which location within the network a requested service should be, such a search has impact on all the nodes of a network.

SUMMARY OF THE INVENTION

The present invention is based on the task to design and further develop a method of the above mentioned kind in such a way that an efficient search is possible with simple means also in dynamic environments. Furthermore, the method should scale.

According to the present invention, the above mentioned task is solved by a method for searching for services, resources and/or functionalities in a network of that kind mentioned at the beginning is characterized in that a corresponding direction is specified within the network by at least one destination node and/or nodes near to the destination node, by which a routing path is defined between the source node and the corresponding destination node, and characterized in that only pre-configurable nodes near to the routing path between source node and destination node are included in the search.

According to the invention, it has first been recognized that an especially efficient search for network-side services, resources and/or functionalities, which will in the following be collectively referred to as services only for reasons of clarity, is possible when first of all, a direction within the network is specified by at least one destination node and/or nodes near to the destination node. The destination node/destination nodes can be a mobile device of the requested communication partner or mobile devices of several communication partners, respectively. The direction can also be specified by nodes located near to the destination node. In the given example it can for example be a base station of the communication partner. In another application, the destination node can be a server, for instance, from which specific data is to be downloaded. According to the invention, by specifying a direction, a routing path is defined between the source node and the corresponding destination node wherein the routing path is formed by a certain number of nodes of the network.

According to the invention, only pre-configurable nodes along the routing path between the source node and the destination node are included in the search. By these means, an efficient search is possible where only a small amount of data is generated. Furthermore, the method according to the invention scales, since also in large networks only nodes are included in the search which are located near to the routing path between the source node and the destination node. Any other nodes of the network are not impacted by the search.

The method according to the invention can for example be used in an advantageous way in modern mobile networks, where participants often have to meet the challenge of finding a good adaptation, transcoding, caching, web-cache and/or SIP-proxy functionalities/servers. Due to a directed search towards the source of a data stream, which for example comes from the home network of the participant, the searched functions can be found near to the routing path of the data stream. The farther the searched service is located from the origin of the search, i.e. from the mobile device of the participant, the more advantageous the search pattern according to the invention becomes when comparing it to known approaches. The method according to the invention is therefore in particular fit for roaming between UTRAN, WLAN, ADSL, Ethernet or other networks.

In ad-hoc networks which are characterized in that there are always new nodes entering the network, while others leave it, neither the known Service Location Protocol (SLP) nor one of the methods mentioned at the beginning can be used. In particular, the so-called flooding is too costly because of the low wireless bandwidth and the typically very restricted power resources of mobile devices. With a search in a specific direction as proposed by the method according to the invention, an effective search is also possible in such ad-hoc networks. In a geographic routing environment, a search can be performed, for example towards a next wired access point, wherein the access point is located for example in a direction towards which one drives or moves.

In the framework of a specifically preferred embodiment, the specification of a search parameter is provided, with the help of which those nodes near to the routing path can be specified that will be included in the search. Furthermore, it can be provided that the search parameter gets adjusted according to the kind of services that are specifically searched for. By these means, a high level of flexibility can be achieved. For example, when searching for a service that is known to be very seldom offered in a network, the search parameters can be defined in such a way that a high number of nodes will be included in the search. The same is valid the other way round for commonly offered services.

In a particularly preferred embodiment, the search parameter is defined as a lateral distance from nodes of the routing path, i.e. as a "sideway expansion". Here, the parameter with which the lateral distance is indicated can be chosen arbitrarily. Concretely, the search parameter can be for example an integer value $i=1, \ldots n$ which indicates the number of hops in lateral distance from the node of the routing path. Consequently, a search parameter $i=2$ means that all the nodes that are laterally at a distance of a maximum of 2 hops from the node of the routing path, will be included in the search. Alternatively, the search parameter can for example also be defined in terms of a geographic distance or a delay in time.

Alternatively, it can be envisioned to define the search parameters as a function of the distance from the source node. By doing so, the lateral distance in which nodes are included in the search can be defined to become smaller when the distance increases. Such a definition is beneficial in case of a search for caching service, because here a positioning of the caching service near to the client, i.e. to the source node, is desirable.

To initiate the search, it can be provided that the source node sends a message to the node of the routing path which is one hop away from itself. The message can first of all comprise data regarding the requested services, as well as the search parameter.

Furthermore, the message can comprise other data which is relevant for the search, such as for example functions which describe for instance a change in the lateral expansion of the search.

In order to propagate the message along the routing path towards the direction of the destination node, each node of the routing path forwards the message when it receives it for the first time to the next node which is one hop away on the routing path.

In order to extend the search in lateral directions, it can be provided that every node of the routing path does not only send the message to the next node on the routing path, but also to nodes that are one hop away in lateral direction on the routing path. The prerequisite for this is that the search parameter allows it. In case the search parameter is defined as a number i of hops as described above, i must consequently not equal to zero. In order to limit the lateral extension of the search according to the defined search parameter, it can be provided that every node, which is located to the side of the routing path and which receives the message for the first time, changes the search parameter, i.e. it decrements for example the number i of hops by 1. If this is applicable and i is still above zero after decrementing, the node can send a message with the changed search parameter to nodes one hop farther away from the routing path.

In a concrete implementation, it is provided that the search will be aborted as soon as a node is discovered which can provide for the requested service. Such an abortion of the search is especially advantageous if the main focus is not on a specific quality of the service, but on a minimization of the search effort. Alternatively, it can be envisioned to abort the search only after such nodes have been discovered, which together can provide all the requested services of a specified quality. The quality can refer to different characteristics of a service, for example its availability, load, capacity, or costs.

For specific applications it has been proved to be especially advantageous to run the search several times, wherein for the first run the search parameter is defined as a small distance from the routing path. For example, the search parameter $i=1$ can be chosen, so in addition to the nodes of the routing path only those nodes are included in the search that are exactly one hop in lateral direction away from nodes on the routing path. In case that in such a first—quick—run no service was found that matched the requested search criterion, the search parameter can be re-defined for subsequent runs as a farther lateral distance from the routing path, as for example $i=2, 3, \ldots$.

The information gained from the nodes included in the search regarding the availability of the requested services can be aggregated in a particularly advantageous way at the source node. Starting at the farthest node of the sideway expansions, corresponding messages, which will be referred to as echoes in the following, can be sent to the nodes of the routing path for this purpose, and from there—starting from the destination node—towards the direction of the source node. In other words, every node sends an echo to its corresponding parent node, i.e. to that node from which it had received the original message. The echo comprises the information of the node itself as well as the—aggregated—information of its child nodes, i.e. of those nodes to which it had sent the message directly or indirectly.

Especially in mobile networks or in ad hoc networks, it can happen that particular nodes do not send an echo. The reason can be, for example, that a node has entered power save mode due to its power state, or that a node has already left the network meanwhile. For these cases, a mechanism, which makes sure that the information can be aggregated at the source node, is advantageous. In this sense, it can for example be provided that a node will first wait for a preconfigurable period of time—timeout—if it doesn't receive an echo from one or more of its child nodes. In case it still hasn't received an echo from the respective nodes after the period of time has elapsed, it can send its echo to its parent node without the information of the corresponding nodes. Since the loss of information for nodes near to the routing path that goes along with such an echo is higher than that for those nodes that are farther away from the routing path, the timeout for a node can advantageously be the longer the closer it is located to the routing path. The nodes of the routing path are therefore assigned the longest timeout, and the nodes of the farthest sideway expansion are assigned the shortest timeout. The defined value of the timeout can be announced to the nodes for example together with the message which was originally sent by the source node and then forwarded to the nodes included in the search.

Regarding the unavailability of some nodes and the used timeout mechanisms, two different cases can be distinguished. First of all, it is possible that the unavailability of a node has already been known for whatever reason. In this sense, within a layered network, it can, for example, be detected by a lower layer that specific nodes are not available, either permanently or temporarily. In such a case, it can be provided that the timer is only started after an echo has returned from all the active nodes. In another constellation it can happen that no information is available at all whether specific nodes suffer from a failure or are not available. In such a case, the timer will be started in an advantageous way only after the message has been distributed among all the nodes included in the search. The length of the timeouts for both of the constellations described above can be chosen independently from each other.

After the end of the search, it can be provided that a virtual or overlay network, is generated, in which nodes are incorporated on the base of search results according to pre-configurable criteria. For example, the nodes can be chosen with respect to possibly low costs or possibly wide-ranging capacities. The virtual or overlay network can then serve as "tunnel network", through which the packets are directed which are related to the usage of the service, without having to change the routing in the actual network.

Now, there are several options of how to design and to further develop the teaching of the present invention in an advantageous way. For this purpose, it must be referred to the claims subordinate to claim 1, on the one hand, and to the following explanation of an example of an embodiment of the invention together with the FIGURE, on the other hand. In connection with the explanation of the preferred embodiment of the invention, generally preferred designs and further developments of the teaching will also be explained.

DETAILED DESCRIPTION OF THE PREFERRED EMBODIMENTS

Figure 1:
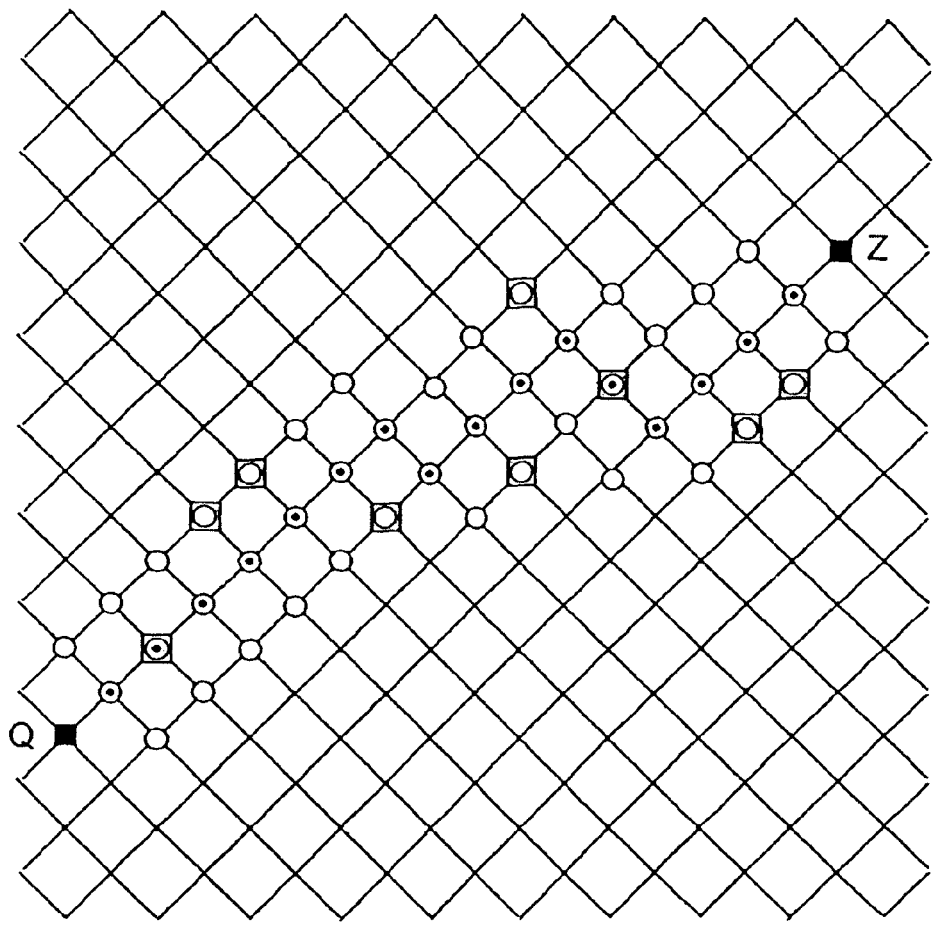
FIG. 1 is a schematic drawing of the structure of a network as well as the basic operation of the method for searching services, resources and/or functionalities in a network according to the invention.

First of all, FIG. 1 shows—schematically—a network with a multitude of nodes, wherein each of the nodes is indicated as an intersection point of two straight lines. The communication within the network is based on a routing mechanism. To every node of the network, a routable network address is assigned.

A source node Q from which the search for a network-side service is initiated, is shown as a filled black square. The search is run in a directed way, i.e. in the direction towards a square which is also filled in black and which represents the destination node Z. Between the source node Q and the destination node Z a routing path is shown. The individual nodes of the routing path are symbolized by white circles with a black point. It is to be pointed out here once again that the search can also be run in a direction towards several different destination nodes Z along a corresponding number of routing paths. For reasons of clarity, in the FIGURE only one destination node Z and, correspondingly, one routing path are shown.

To start the search, first of all a so-called "OnStart" process is run. In the context of the "OnStart" routine, the source node Q invokes the node of the routing path which is one hop away from itself and then sends a message to this node. The message contains a control message regarding the service to be searched for, as well as a search parameter.

The search parameter indicates how far the search is to be expanded to lateral directions from the routing path. In particular, the search parameter is defined as an integer i, which implies that nodes that are located on a lateral direction i hops away from the node on the routing path, will be included in the search. In the example depicted, i is chosen as i=1, i.e. only the nodes on the routing path that are direct neighbors in the lateral direction, are included in the search. In FIG. 1, all of the nodes included in the search are depicted as white circles.

As soon as the first node of the routing path has received the message from the source node Q, it runs an "OnInitiate" routine. In the context of this routine and based on the information contained in the message, it checks first of all whether it is an intermediary node or not. If it is an intermediary node it determines the next neighboring node on the routing path to which it transmits the message. Furthermore, it also analyzes the search parameters included in the message regarding the lateral extension of the search. In the depicted example, i.e. with i=1, the node sends the message in addition to nodes in its lateral neighborhood. The lateral nodes receive the message and determine they are no intermediary nodes, i.e. they are not on the routing path. Consequently, they decrement the search parameter by the value 1. If the result is above 0, they wait for a pre-configurable period of time and then send the message to nodes farther away. In the depicted example, after decrementing, the result equals zero. Consequently, the message is not forwarded, i.e. the search in lateral direction is aborted.

In a next step, an "OnAggregate" routine is run. Here, all the information regarding the availability (and—if applicable—regarding its quality) gained from the nodes included in the search is aggregated at the source node Q. Every node keeps a list of its children, i.e. of those nodes to which it has sent its message, as well as of their children. If a node has received an echo from all its children in the context of an "OnAggregate" routine, it starts the so-called "OnComplete" method, i.e. it stops its activities regarding the search. The same is valid for nodes which do not have any children, i.e. for those nodes that are the farthest away in lateral direction from the routing path.

As soon as the source node Q has received an echo from all its children, an "OnTerminate" routine is run. This routine is the end of the search.

Regarding the availability of the service which was searched for, there is information of all the nodes included in the search available at the source node Q after the end of search. Based on additional information, which indicates for example how much data a node can process for the searched service and which indicates the costs for the usage of this service, an overlay network is generated. This overlay network comprises those nodes that match the pre-configurable criteria—such as for example most cost-efficient path, smallest load etc.—best. The nodes chosen for the overlay network which are in the FIGURE surrounded by a grey-colored square, form a tunnel through which the packets can be directed without the necessity of changing the routing within the network.

Finally, it is particularly important to point out that the example above of an embodiment chosen arbitrarily only serves as an illustration of the teaching according to the invention, but that it does by no means restrict the latter to the given example of an embodiment.

The invention claimed is:

1. A method for searching services, resources and/or functionalities in a network, wherein the network comprises a multitude of nodes to which routable network addresses are assigned, wherein the services, resources and/or functionalities that are to be searched are specified by a source node, the method comprising:

specifying a direction within the network by at least one destination node and/or nodes near to the destination node, by which a routing path is defined between the source node and the corresponding destination node; and including in the search only preconfigurable nodes near to the routing path between the source and destination nodes, wherein every node that is searched sends an echo back to its corresponding parent node and wherein each parent node—in case it has not received an echo from one or more of its child nodes—waits for a pre-configurable period of time—a timeout—before it sends an echo without the information of the corresponding child nodes to its parent node, wherein the timeout for a node is longer the closer the node is positioned to a node on the routing path.

* * * * *